(12) United States Patent
Racunas et al.

(10) Patent No.: US 7,747,897 B2
(45) Date of Patent: Jun. 29, 2010

(54) METHOD AND APPARATUS FOR LOCKSTEP PROCESSING ON A FIXED-LATENCY INTERCONNECT

(75) Inventors: Paul B. Racunas, Marlborough, MA (US); Matthew Mattina, Worcester, MA (US); George Z. Chrysos, Milford, MA (US); Shubhendu S. Mukherjee, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 11/282,213

(22) Filed: Nov. 18, 2005

(65) Prior Publication Data

US 2007/0168712 A1 Jul. 19, 2007

(51) Int. Cl.
G06F 11/00 (2006.01)
G06F 17/00 (2006.01)
G06F 12/00 (2006.01)
G06F 13/00 (2006.01)
G06F 13/28 (2006.01)

(52) U.S. Cl. ............ 714/11; 714/53; 714/54; 711/170; 707/100; 707/170; 707/202

(58) Field of Classification Search .......... 714/10, 714/15, 18
See application file for complete search history.

(56) References Cited

U.S. PATENT DOCUMENTS

| | | | | |
|---|---|---|---|---|
| 5,666,559 A | * | 9/1997 | Wisor et al. ............... | 710/32 |
| 6,526,498 B1 | * | 2/2003 | Mirsky et al. ............. | 712/11 |
| 6,662,252 B1 | * | 12/2003 | Marshall et al. ........... | 710/200 |
| 7,418,534 B2 | * | 8/2008 | Hayter et al. ............. | 710/104 |
| 2002/0007404 A1 | * | 1/2002 | Vange et al. .............. | 709/217 |
| 2002/0026604 A1 | * | 2/2002 | Bissett et al. ............. | 714/12 |
| 2002/0152420 A1 | * | 10/2002 | Chaudhry et al. .......... | 714/11 |
| 2002/0188832 A1 | * | 12/2002 | Mirsky et al. ............. | 712/228 |
| 2003/0005380 A1 | * | 1/2003 | Nguyen et al. ............ | 714/736 |
| 2005/0027911 A1 | * | 2/2005 | Hayter et al. ............. | 710/62 |
| 2005/0044319 A1 | * | 2/2005 | Olukotun .................. | 711/118 |
| 2005/0240810 A1 | * | 10/2005 | Safford et al. ............ | 714/10 |
| 2005/0240811 A1 | * | 10/2005 | Safford et al. ............ | 714/11 |
| 2005/0240829 A1 | * | 10/2005 | Safford et al. ............ | 714/43 |
| 2006/0041715 A1 | * | 2/2006 | Chrysos et al. ............ | 711/110 |

OTHER PUBLICATIONS

Georgiadis, "Throughput Properties of fair policies in ring networks", IEEE/ACM Transaction on Networking vol. 1, No. 6, Dec. 1993, pp. 718-728.*

Qiao, "Reconfiguration with Time Division Multiplexed MIN's for Multiprocessor Communications" 1994, IEEE, pp. 337-352.*

Kulkarni, "Programming Challenges in Network Processor Deployment", Nov. 2003, ACM, pp. 1-10.*

* cited by examiner

Primary Examiner—Emerson C Puente
Assistant Examiner—Jeison C Arcos
(74) Attorney, Agent, or Firm—Blakely, Sokoloff, Taylor & Zafman LLP

(57) ABSTRACT

Methods of operating two or more devices in lockstep by generating requests at each device, comparing the requests, and forwarding matching requests to a servicing node are described and claimed. A redundant execution system using the methods is also described and claimed.

10 Claims, 6 Drawing Sheets

METHOD AND APPARATUS FOR LOCKSTEP PROCESSING ON A FIXED-LATENCY INTERCONNECT

FIELD OF THE INVENTION

The invention relates to redundant processing. More specifically, the invention relates to maintaining synchronization between redundant processors and other devices operating in lock step.

BACKGROUND

Computer systems often perform critical control, analysis, communication, and other functions in hostile environments. When these systems are physically difficult or impossible to reach, it is important that adequate redundancy be provided so that malfunctions and spurious errors can be detected and automatically recovered. One common way of protecting against computer system errors is to employ dual-modular redundancy or triple-modular redundancy: to operate two or three (or more) system modules in lockstep and compare their behavior. If several identical modules perform the same operation, then—in theory—any differences between the modules' behavior may indicate that one or more of the modules has malfunctioned. Differences could be detected—again, theoretically—simply by comparing signals present at certain key places in the systems (for example, at the address and data buses) and starting error recovery procedures whenever a signal mismatch is detected.

In practice, clock skew and similar effects cause signal mismatches even when the modules are operating properly. Since error recovery can be a computationally expensive process, erroneous lockstep-failure signals can seriously degrade system performance. Also, error recovery may involve different operations on each of the modules, and there may be no effective redundant system to protect the recovery against errors that occur then. Furthermore, traditional lockstep redundant systems contain specialized hardware circuits to perform signal comparison. These circuits may reduce the system's flexibility to operate as an ordinary multiprocessor system when redundant processing is not required.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF DRAWINGS

Embodiments of the invention place processors, memory, and other devices at positions around a fixed-latency, circular interconnection network. Each node of the network can send messages to any other node, and the network's fixed-latency property permits the sender to determine how long it will take for the message to arrive at the destination node. This arrangement of system components can support operational paradigms including ordinary multiprocessing and redundant, lockstep processing. In lockstep mode, the system automatically filters out many innocuous timing errors caused by clock skew. Most signaled errors represent true data differences.

Figure 1:
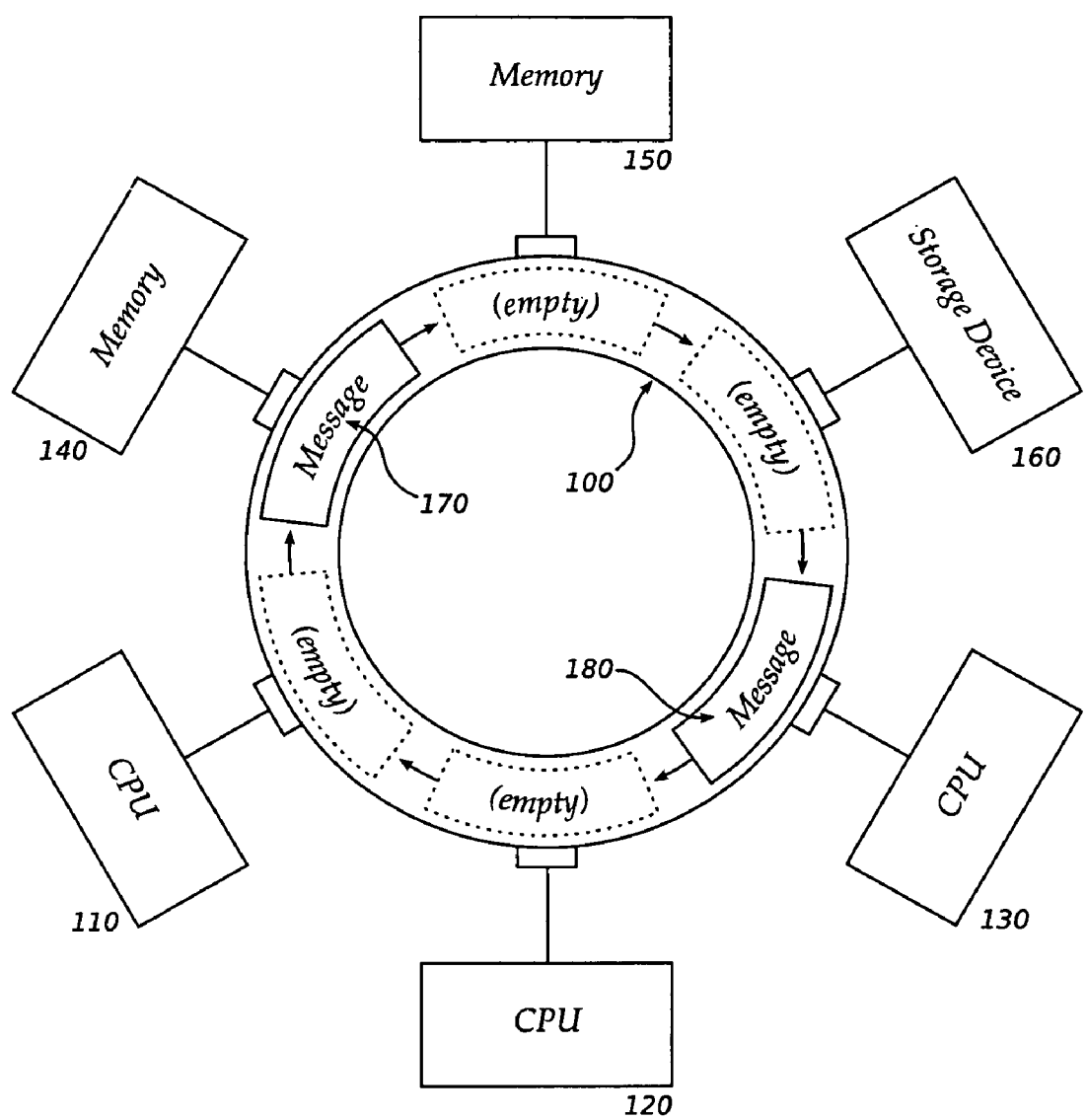
FIG. 1 shows a logical overview of a system implementing an embodiment of the invention.

FIG. 1 shows a diagram of a system incorporating an embodiment of the invention. Ring 100 represents a fixed-latency, unbuffered, circular communication network. Devices connected to the network can place messages on the ring or remove them from the ring. Messages such as 170 and 180 progress clockwise around the ring, from the sending node to a-destination node. If the destination node is unable to accept the message (for example, because it is busy or because it has no free buffer space), the message continues around the ring until the destination node becomes able to accept it. A node may place a message on the ring whenever no message is passing by the node. The ring operates synchronously, with messages moving from one node to the next at regular intervals. Thus, a sender that knows how far around the ring its target lies, can determine how long it will take a message to travel there. (Of course, the target may be unable to accept the message when it arrives; the sender must account for this possibility.) Although this diagram shows a number of messages and empty message locations equal to the number of nodes, a practical implementation may permit more messages to be placed on the ring. However, the network is unbuffered, so its capacity is not elastic.

The property of the communication network that is relevant to embodiments of the invention is that a sender can determine how long it will take a message to travel to a receiver. The fixed-latency, unbuffered circular network shown as element 100 has this property, and provides an easy-to-understand structure for use in the following descriptions. However, embodiments are not limited to a ring topology network, or even a fixed-latency interconnect, as long as the network permits an acknowledgement signal to be transmitted with a known latency.

A range of devices may be placed at nodes of ring 100. In FIG. 1, three central processing units ("CPUs") 110, 120 and 130 are shown. Two memory modules, 140 and 150, and a storage device 160 are also disposed around the ring. The description and depiction of the communication network refer to the logical structure of the network, and not its physical structure. An actual implementation might place the circular communication network entirely within an single microelectronic circuit or distribute it over two or more circuits, as long as the communication capabilities described are available.

In some systems, the communication network might be bi-directional, with messages traveling either clockwise or counter-clockwise around the ring. (Such a system can be analyzed as two superimposed unidirectional rings.) For simplicity and ease of understanding, however, most of the following examples will assume a single, unidirectional, fixed-latency, unbuffered communication fabric.

A system with two instances of a component on the ring can operate the components in a lockstep, redundant mode, and signal a possible lockstep error if the components place dissimilar messages on the ring despite receiving identical messages. Thus, for example, memories 140 and 150 can be operated in lockstep and spurious errors affecting only one memory can be detected if the memories respond differently.

A system with three or more instances of a component on the ring can perform the same lockstep processing, but may also be able to determine which of the components has failed or experienced an error by using a voting protocol: if two of the three instances agree (or, more generally, if a majority of the instances agree), then the system can proceed as the majority of messages indicate.

Figure 2:
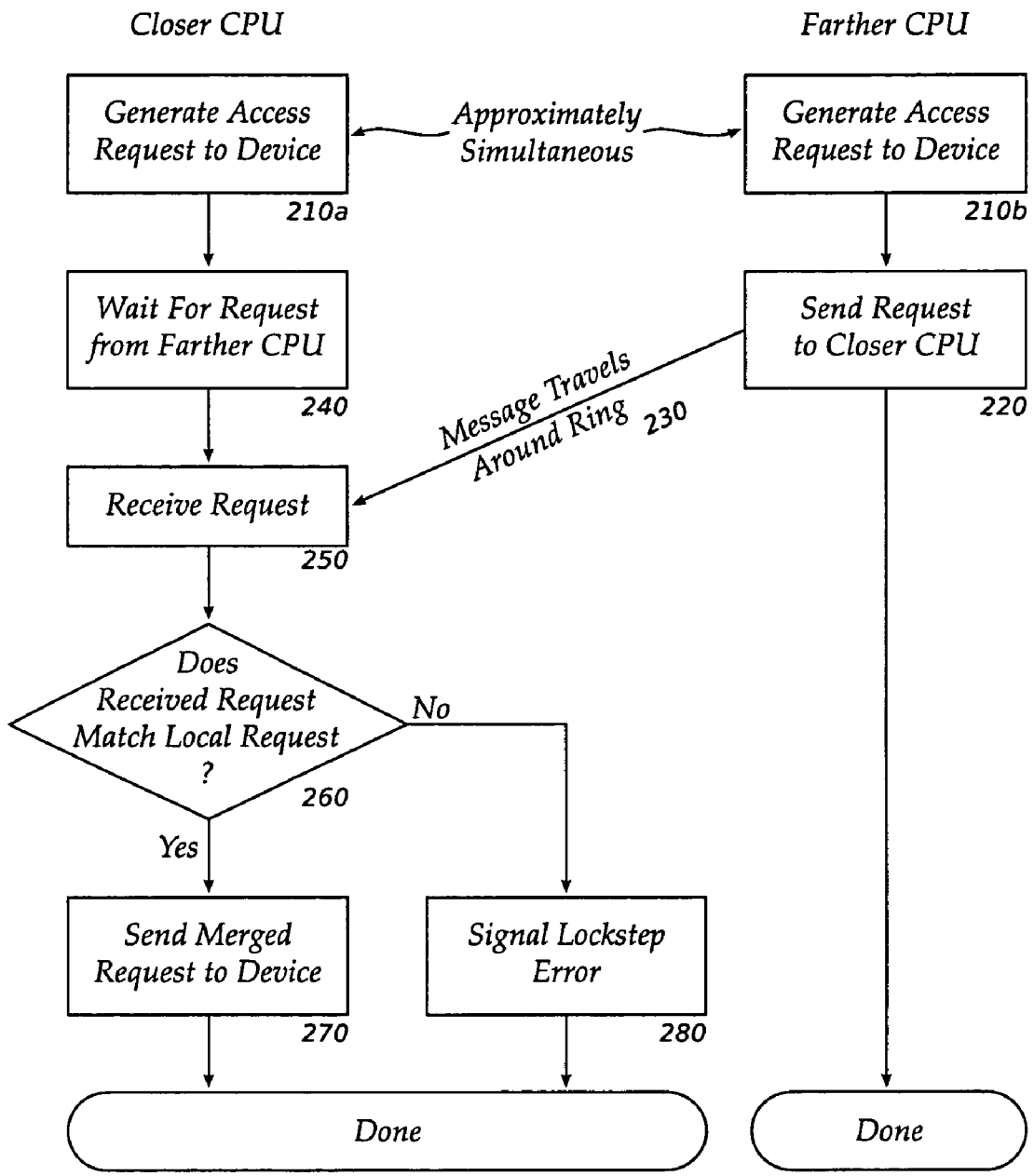
FIG. 2 is a flowchart of a procedure two lockstep processors can follow to ensure that a request they issue is correct.

The flow chart of FIG. 2 shows how two CPUs operating in lockstep can send a request to another device on the fixed-latency communication network. The CPUs are designated as "closer" and "farther" to indicate their positions on the ring relative to the destination device. Both CPUs, executing the same instructions in close (but possibly inexact) synchronization, generate an access request to the device (210*a*, 210*b*). If the CPUs were operating independently, each would simply place a message on the ring and send it to the device, which would respond to each message by placing an appropriate reply on the ring. However, in lockstep, the "farther" CPU transmits the request to the "closer" CPU (220). The message travels around the ring to the closer CPU (230), while the closer CPU waits for it (240). Eventually, the closer CPU receives the request (250) and compares it to its own locally-generated request (260). If the requests match, the closer CPU sends a single, merged request to the device (270). If the requests do not match, the closer processor signals a lockstep error (280) to initiate lockstep recovery procedures. The request itself might be to obtain data from a memory or other device, or to store data in the memory or send it to the device. In this respect, requests may correspond to ordinary memory read or write cycles, or to I/O port "IN" and "OUT" operations.

This procedure is resilient against timing errors: if the farther processor generates and sends the request before the closer processor, the request will simply circulate the ring until the closer processor catches up and is ready to receive and compare the requests. If the closer processor is ahead, it will wait until the farther processor catches up and sends the request. In either case, watchdog timer logic can raise a lockstep error signal if it detects that either processor spends too long waiting for the other to catch up.

Figure 3:
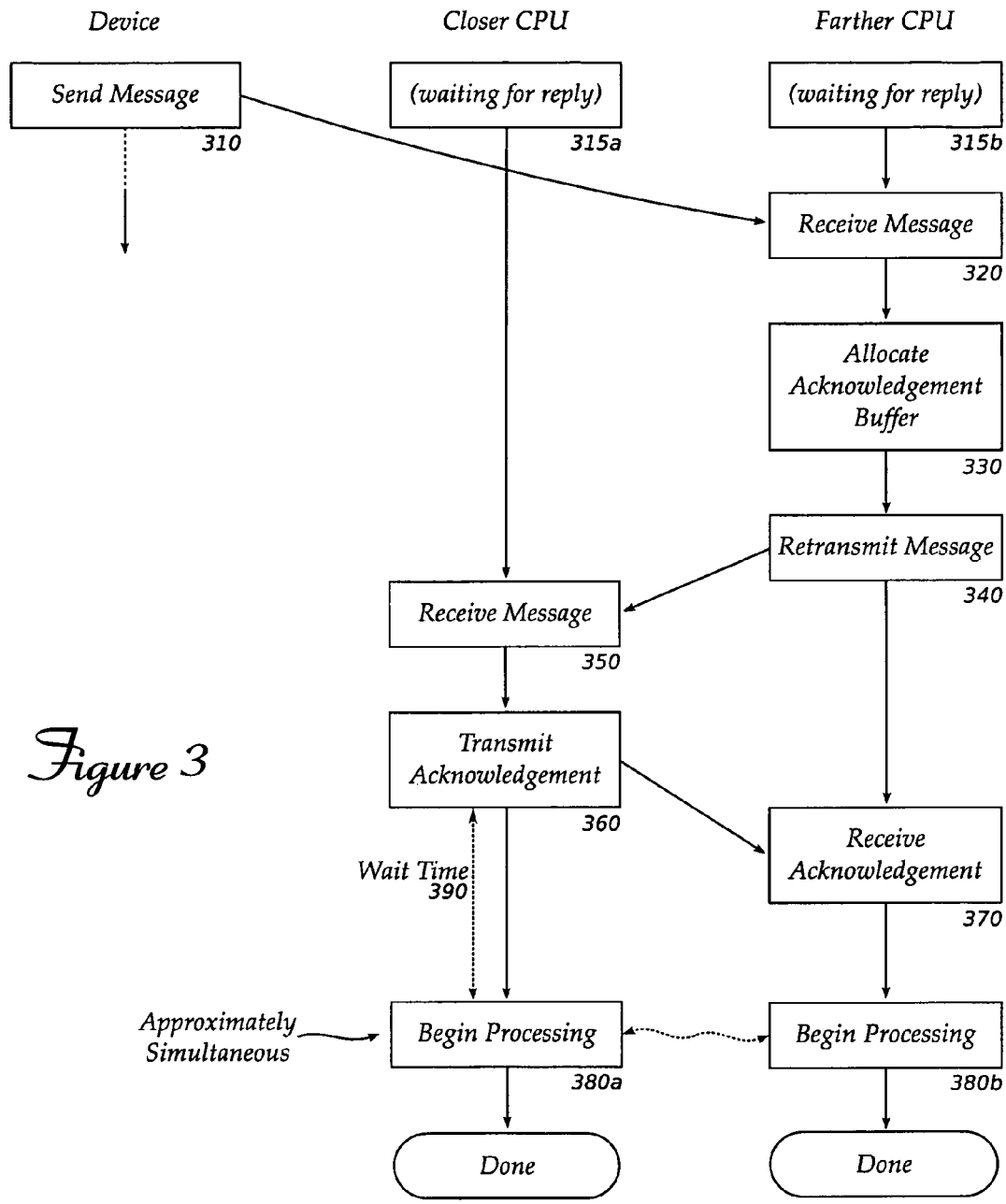
FIG. 3 is a flowchart of a procedure to permit two lockstep processors to receive a message and to begin processing its contents simultaneously.

The procedure for receiving a message directed to two or more lockstep components is slightly more complicated, because it is desirable for the components to begin processing the message simultaneously. In one embodiment, processing a message comprises executing an instruction, operating on a data value, and storing a data value. FIG. 3 shows how this can be accomplished.

The device sending the message to the lockstep components places the message on the ring, addressed to one of the components (310). For example, if the device is responding to the merged message whose transmission was discussed in reference to FIG. 2, the reply might be sent to the processor identified as "farther" in that figure, because on a unidirectional ring, the "farther" processor is actually closer to the device. Both farther and closer processors are waiting for the reply (315*a*, 315*b*).

The farther processor receives the message (320) but does not begin processing it immediately. Instead, it allocates a buffer to hold an acknowledgement (330) and retransmits the message to its lockstep twin, the "closer" processor (340). The closer processor receives the message (350) and transmits an acknowledgement to the farther processor (360). The farther processor is able to receive the acknowledgement (370) as soon as it passes on the ring, because it had previously allocated a buffer to hold the acknowledgement. Both processors begin processing the message (380*a*, 380*b*). For example, the message may contain data required for a calculation the processors are performing, or may contain instructions for the processors to execute. Processing starts simultaneously, because the closer processor is able to calculate the appropriate wait time (390) from the speed of the fixed-latency network and the number of nodes between the closer and farther processors. Recall that embodiments of the invention can use non-circular and/or variable latency networks, as long as a sender is able to calculate the latency for an acknowledgement message. That latency is the appropriate wait time 390, and knowledge of it is what permits the closer and farther processors to begin processing the message at the same time.

Figure 4:
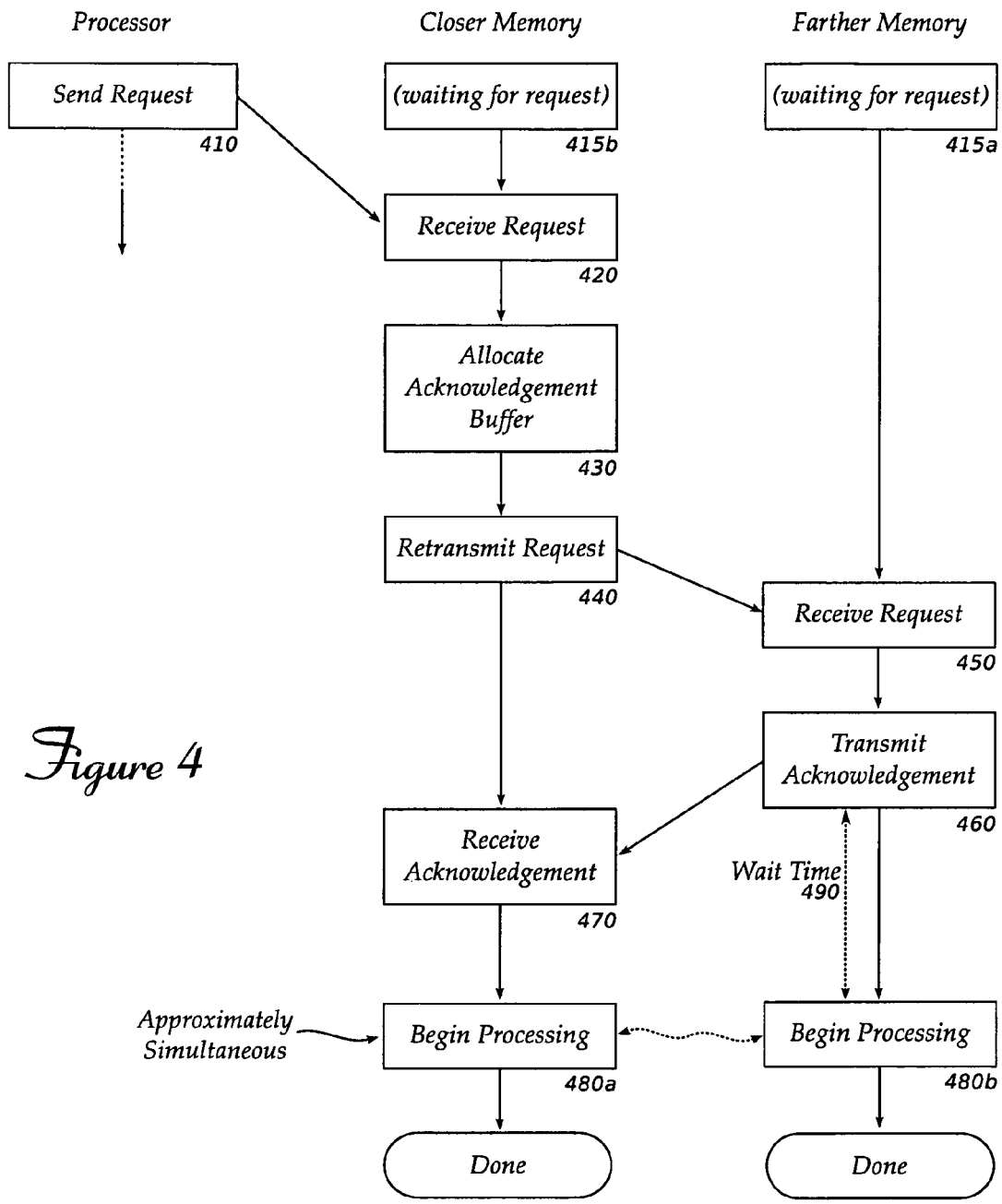
FIG. 4 is a flowchart of a similar procedure that can be followed by "slave" devices operating in lockstep.

Although the foregoing flow charts have focused on the actions of embodiments of the invention with two lockstep CPUs sending requests and receiving a response from a single device, the protocol can also be operated to permit a processor (or a group of lockstep processors) to interact with redundant, lockstep devices. For example, a request from a processor, or a merged request from two or more lockstep processors, to obtain or store data in a memory can be directed to two or more lockstep memories. By following the flowchart of FIG. 3, the two memories can arrange to perform the fetch or store operation simultaneously, as described in FIG. 4.

First, the processor (or closer processor) sends the memory request to the closer memory (410). The closer memory receives the request (420), allocates an acknowledgement buffer (430), and retransmits the request to its lockstep twin memory (440). The lockstep twin receives the request (450) and returns an acknowledgement (460). The closer memory receives the acknowledgement (470) and both memories begin the fetch or store operation simultaneously (480*a*, 480*b*). The lockstep twin is able to calculate the appropriate wait time (490) based on the speed of the fixed-latency network and the number of nodes the acknowledgement must pass to reach its destination.

Figure 5:
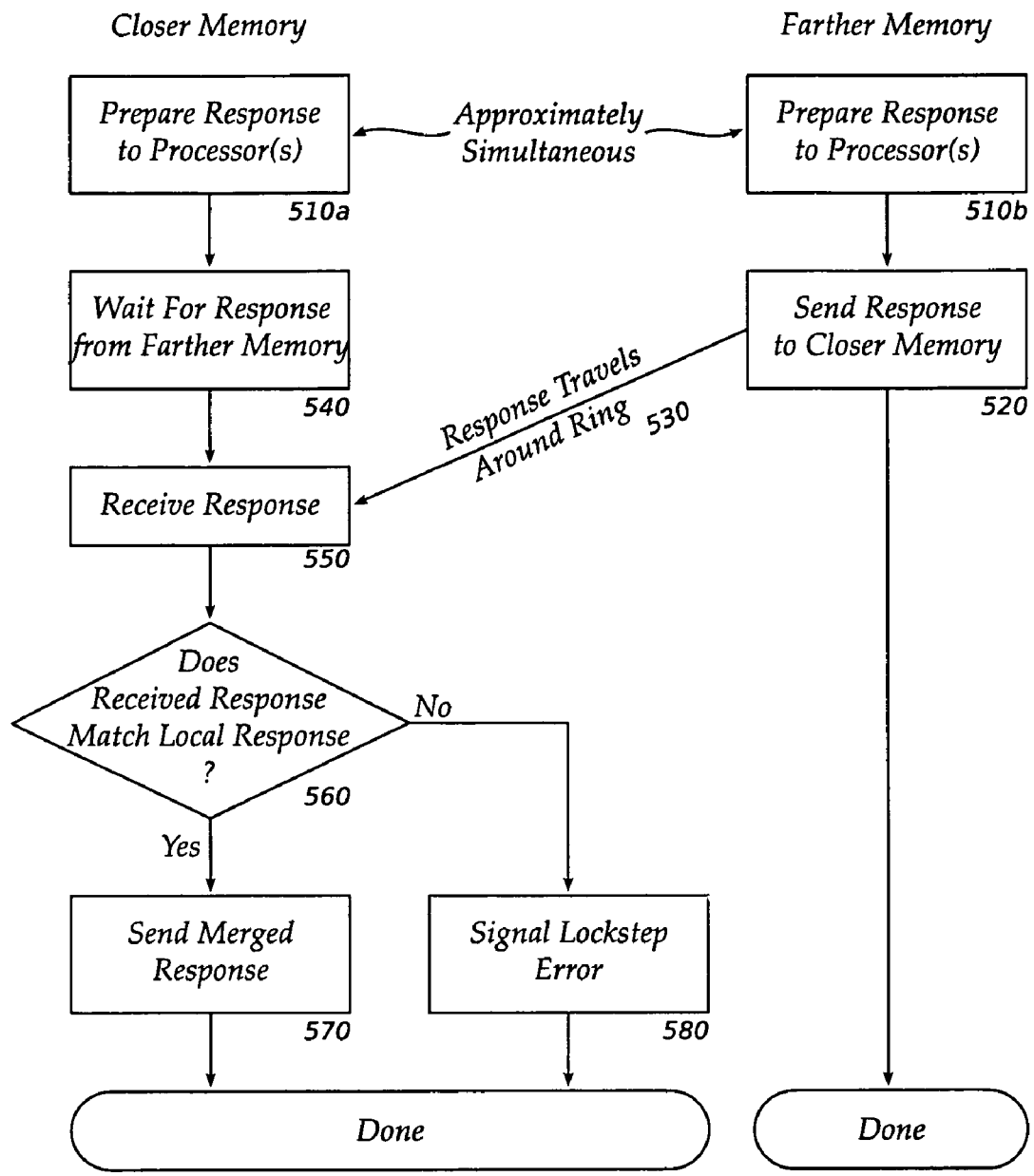
FIG. 5 is a flowchart of another procedure for slave lockstep devices.

Furthermore, the two memories can follow a protocol similar to that described with respect to FIG. 2 to send a verified reply to the requesting processor(s). This is shown in FIG. 5: both memories prepare a response (510*a*, 510*b*). The responses are generated substantially simultaneously because the memories are operating in lockstep and, as described above, they have started the fetch or store operation at the same time. The farther of the memories sends its response to the closer (520), and the response travels around the ring (530) while the closer memory waits (540). The closer memory receives the response (550) and compares it to its own response to determine whether they match (560). If the responses match, a merged response is sent to the requesting processor (570). If there is a discrepancy, a lockstep error signal can be raised (580) to trigger error recovery procedures.

The preceding discussion has assigned semantic names such as "request," "response," and "acknowledgement" to messages transmitted and received over the network. However, it should be clear that a "request" message may be different from a "response" message only in that the request comes before the response, and causes some device or group of lockstep devices to reply by sending the response. The request, response, and acknowledgement are all simply messages from a source node to a destination node as far as the network is concerned.

Figure 6:
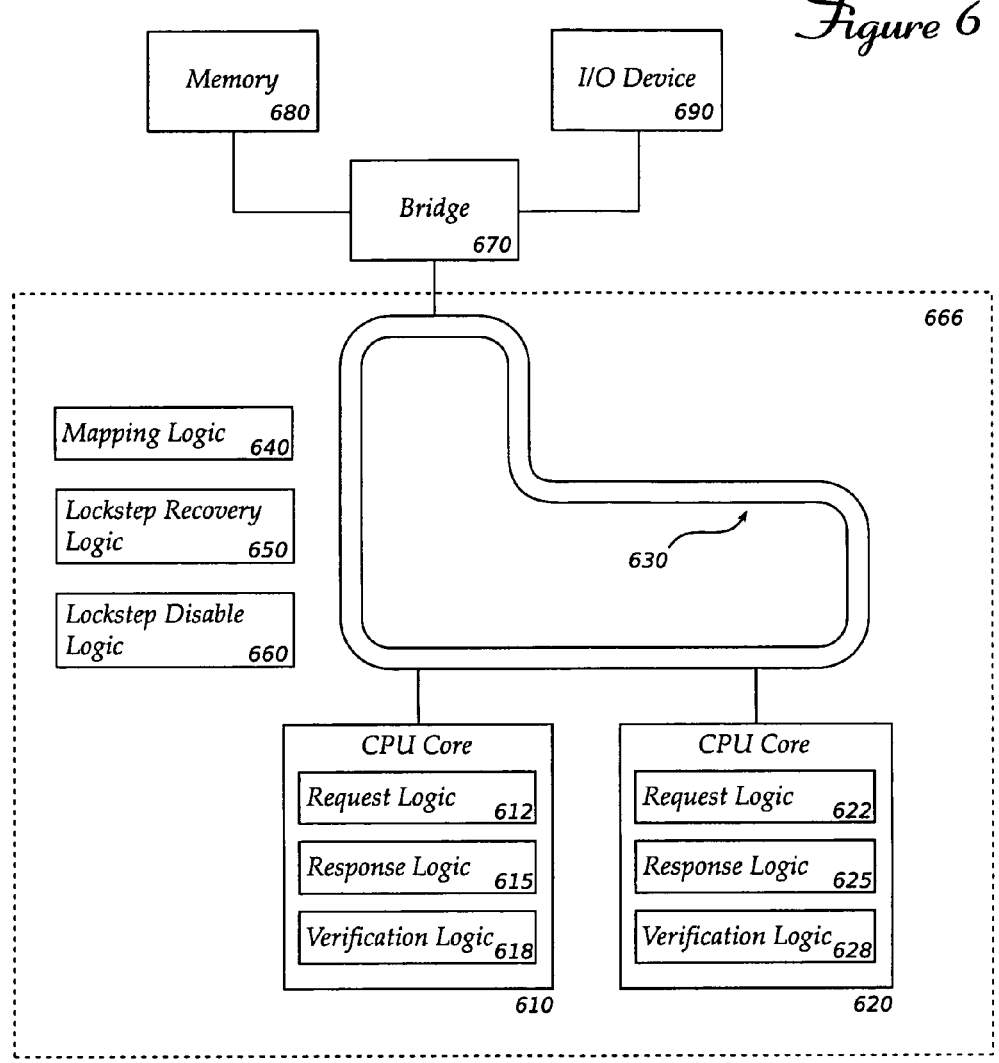
FIG. 6 shows an example system including logic modules to implement functions of use to embodiments of the invention.

FIG. 6 shows some logical components of a multiprocessor system implementing an embodiment of the invention. CPU cores 610 and 620 may be independent physical devices or may be fully- or partially-autonomous portions of a single "multi-core" processor. Some systems may have more than two physical CPUs, more than two cores in a single processor, or more than one multi-core processor. The CPUs are attached as nodes of network 630. The network may be implemented in a separate circuit, or may exist as a subcomponent of a multi-core processor or another processor support circuit. Messages travel around the network and may be removed by a device at a destination node. Nodes are able to calculate the latency of at least some messages. This system contains only one memory 680 and one I/O device 690, and communication between the CPU cores and the memory or device is routed through a bridge 670, but the methods of embodiments of the invention can be used by systems containing multiple memories and/or devices, either with or without a bridge device.

The system contains mapping logic 640 to determine the relative positions of nodes on network 630, and to identify which of two nodes is closer to a third node. Processors 610 and 620 each include request logic 612, 622, to coordinate requests from the processors to the memory 680 or I/O device 690 when the processors are operating in lockstep mode. Request logic 612, 622 implements the procedure explained with reference to FIG. 2 by sending a request from the farther processor to the closer processor, comparing the request to a request generated at the closer processor, and sending a merged request to the destination. In a system containing multiple lockstep memories or I/O devices, those devices would contain logic corresponding to request logic 612, 622 to implement the procedure of FIG. 5 and permit the lockstep memories or I/O devices to coordinate responses to the processor(s).

Processors 610 and 620 also include response logic 615, 625, to coordinate the processors' handling of responses from the memory or I/O device(s). Response logic implements the procedure described with reference to FIG. 3. Logic corresponding to response logic 615, 625 would also be found in the memories and I/O devices of a system with multiple redundant instances of those components.

Request verification logic 618, 628, compares a message received from another processor with a message generated locally, and signals a lockstep error if the messages do not match; and lockstep recovery logic 650 permits the processors (or other lockstep devices, in appropriate systems) to recover from lockstep errors.

The various logic blocks shown may be implemented as hard-wired circuit elements, microcode or similar firmware or software, or as a combination of hardware and software. The system shown in FIG. 6 also includes a lockstep disabling logic 660 to disable the lockstep failure signal and other lockstep-facilitating logic features. This permits the processors, memory, and I/O device to operate as an ordinary multiprocessor system, where each processor independently executes its own instruction stream, and no redundancy checks are performed.

As shown in FIG. 6, the CPU cores 610 and 620, as well as network 630 and the various logic elements, may be instantiated in a single, monolithic, multi-core CPU device (see dashed line 666). In such an embodiment, the multi-core CPU can directly replace an ordinary (non-lockstep) multi-core CPU in a system. Such a replacement would permit the system to operate in a redundant processing mode for increased reliability, or (with the lockstep logic disabled) as a normal multiprocessor system. Memory 680 might use error-correction code ("ECC") circuitry or other similar techniques instead of multiple redundant units to achieve comparable reliability.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROMs), Read-Only Memory (ROMs), Random Access Memory (RAM), Erasable Programmable Read-Only Memory (EPROM), and a transmission over the Internet.

The applications of the present invention have been described largely by reference to specific examples and in terms of particular allocations of functionality to certain hardware and/or software components. However, those of skill in the art will recognize that lockstep circuit operations built on a determinable latency network can also be produced by software and hardware that distribute the functions of embodiments of this invention differently than herein described. Such variations and implementations are understood to be encompassed by the following claims.

We claim:

1. A method comprising:
   simultaneously generating a first request at a first computer device to access a system resource and generating a second request at a second computer device, in communication with the first computer device, to access the system resource, the first computer device being closer to the system resource while the second computer device being farther from the system resource, wherein the computer devices are designated as closer and farther to indicate their position on a fixed-latency interconnect relative to the system resource;
   receiving, at the first computer device that is closer to the system resource, the second request from the second computer device that is farther from the system resources to access the system resource over the fixed-latency interconnect;
   comparing the first request to the second request;
   if the first request matches the second request, merging the first request and the second request into a merged request and sending the merged request over the fixed-latency interconnect to the system resource from the first computer device; and
   if the first request differs from the second request, generating a lockstep error and signaling a lockstep failure in response to the lockstep error.

2. The method of claim 1 wherein the first request and the second request are to obtain data from a memory.

3. The method of claim 1 wherein the first request and the second request are to send data to a component or receive data from the component, wherein the component is different from a plurality of devices operating in lockstep.

4. A processor comprising:
   mapping logic to determine the relative position of a first processor core and a second processor core to system resources, wherein the first and second processor cores are coupled with an interconnection network, wherein the mapping logic further identifies which of the first and second processor cores is closer to the system resources, the first processor core being closer to the system resources and the second processor being farther from the system resources to access system resources;

request logic to generate a first request at the first processor core and a second request at the second processor core to access the system resources, wherein the request logic is further to coordinate the first and second requests from the first and second processing cores, respectively, to the system resources, the request logic is further to receive, at the first processor core that is closer to the system resources, the second request from the second processor core that is farther from the system resources; and verification logic to compare the first request to the second request, wherein the request logic is further to merge the first and second requests into a merged request if the first request matches the second request, and to generate a lockstep error if the first request differs from the second request;

response logic to coordinate responses to the first and second processor cores and the system resources, the response logic is further to send the merged request to the system resources or signal a lockstep failure in response to the lockstep error.

5. The processor of claim 4, further comprising:
lockstep disabling logic to disable lockstep logic elements.

6. The processor of claim 4, further comprising:
lockstep recovery logic to synchronize the first and second processor cores.

7. The processor of claim 4 wherein the response logic is to receive a response at the first processor core;
allocate an acknowledgement buffer at the first processor core;
send the response to the second processor core; and
delay response processing until an acknowledgement is received from the second processor core.

8. A machine-readable medium that provides instructions that, when executed by a data processing device, cause the data processing device to perform operations comprising:
simultaneously generating a first request at a first computer device to access a system resource and generating a second request at a second computer device, in communication with the first computer device, to access the system resource, the first computer device being closer to the system resource while the second computer device being farther from the system resource;
receiving, at the first computer device that is closer to the system resources, the second request from the second computer device that is farther from the system resources to access the system resource over a fixed-latency interconnect;
comparing the first request to the second request;
if the first request matches the second request, merging the first request and the second request into a merged request and sending the merged request over the fixed-latency interconnect to the system resource from the first computer device; and
if the first request differs from the second request, generating a lockstep error and signaling a lockstep failure in response to the lockstep error.

9. The machine-readable medium of claim 8 wherein the first request and the second request are to obtain data from a memory.

10. The machine-readable medium of claim 8 wherein the first request and the second request are to send data to a component or receive data from the component, wherein the component is different from a plurality of devices operating in lockstep.

* * * * *